United States Patent [19]

Orcutt

[11] 4,206,645
[45] Jun. 10, 1980

[54] PROPORTIONAL STROKE AUTOMATIC TEMPERATURE CONTROL SYSTEM

[75] Inventor: John W. Orcutt, Norton, Mass.

[73] Assignee: Texas Instruments Incorporated, Dallas, Tex.

[21] Appl. No.: 830,530

[22] Filed: Sep. 6, 1977

Related U.S. Application Data

[60] Division of Ser. No. 501,711, Aug. 29, 1974, Pat. No. 4,063,682, which is a continuation-in-part of Ser. No. 422,954, Dec. 7, 1973, abandoned.

[51] Int. Cl.² .............................................. G01K 1/08
[52] U.S. Cl. ...................................... 73/349; 73/362.8
[58] Field of Search .................. 236/87, 49, DIG. 19, 236/91 R; 73/349, 362.8

[56] References Cited

U.S. PATENT DOCUMENTS

| | | | |
|---|---|---|---|
| 3,301,059 | 1/1967 | Haas | 73/349 X |
| 3,596,518 | 8/1971 | Kirkpatrick | 73/349 X |
| 3,665,763 | 5/1972 | Grey | 73/349 X |
| 4,038,105 | 7/1977 | Brandeberry | 73/349 X |

Primary Examiner—William E. Wayner
Attorney, Agent, or Firm—John A. Haug; James P. McAndrews

[57] ABSTRACT

This invention relates to an automatic temperature control system for automobiles and improved components thereof and in particular to an in-car air sensing tube biased with ambient air and a sensor in an aspirator at the end of the tube.

7 Claims, 4 Drawing Figures

PROPORTIONAL STROKE AUTOMATIC TEMPERATURE CONTROL SYSTEM

This is a division of application Ser. No. 501,711, filed Aug. 29, 1974, which issued on Dec. 20, 1977 as U.S. Pat. No. 4,063,682 which in turn is a continuation-in-part of Ser. No. 422,954, filed Dec. 7, 1973, now abandoned.

BACKGROUND OF THE INVENTION

A. Field of the Invention

This invention relates in general to improved components of an automatic temperature control system for automobiles.

B. Description of the Prior Art

Automatic temperature control systems were first introduced in about 1964 in the United States and are now available on most large size cars. In the systems heretofore, the components of the system have been scattered throughout the car, being interconnected by vacuum and wiring harnesses. One of these systems, for instance, has a main component grouping on the power servo, with other hardware located on the dash control, in ducts, on the air conditioning case, and in the engine compartment. Another has many components grouped on the heater-air conditioning case, with other components on the dash control, under the dash and in the engine compartment. These systems are generally complicated, difficult to install and maintain, expensive to produce and inaccurate.

The components of such systems and their function is as set forth below:

1. Sensors—to sample in-car and ambient temperature;
2. Transducers—to convert the sensors' output to a control signal;
3. A power servo—to convert the control signal to a stroke, thereby driving program switches and a temperature door. Bimetal sensors have been used to sense temperature changes and provide a signal responsive thereto for many years. However, the signal from such a sensor is very small and is rarely able by itself to provide the necessary force to activate a mechanical or electrical system of which the sensor is a part;
4. Program switches—to control system functions such as air discharge location, blower speed, recirculation, water valve, on-off function, etc.;
5. A temperature blend door—to modulate the air discharge temperature from the heater-air conditioning system;
6. Dash controls—contains levers used by the driver of a car to adjust and set the system to the desired mode and condition of operation;
7. Selector switches—operated by the dash controls;
8. Cold engine lockout (CELO) valve—to delay the system operation in its heater mode until the heater core is warm;
9. Compressor ambient switch—to control the compressor operation as a function of the ambient temperature;
10. A water valve—controlled by a program switch to turn water off to the heater core under maximum cooling conditions; and
11. A resistor block—contains a dropping resistor for fan speed control. This works in conjunction with the program switches.

There are many problems associated with these systems.

In operation, these systems generally have two sensors which individually sense the ambient and in-car temperature and convert these readings to either electronic or mechanical signals. The ambient signal is used to bias the in-car signal and the single output is used to control the operation of the system. The appropriate temperature is generally supplied by the operation of a temperature blend door whose opening and closing regulates the heat and air conditioning supplied from the heater and air conditioner.

Since the sensors are often mounted at the end of long tubes supplying the in-car and ambient air, error in the sensing apparatus is often introduced by the air passing through long super-heated stretches which bias the temperature of the incoming air. For instance, the in-car air is often sampled by letting air enter a tube which is underneath the dash. By the time the air reaches its sensor near the fire wall, the temperature of the air in the tube has often reached an elevated temperature to that of the original air by reason of bias occurring when the air passed through heated areas under the dash. This problem has sometimes being corrected by placing the sensors at the spot where sampling air was taken in, but this requires long electrical leads and electrical conversion signals for changing the temperature of the air sensed to an appropriate electrical value.

SUMMARY OF THE INVENTION

This invention is for a system for automobiles in which the ambient and in-car air is fed through a delivery tube wherein the in-car air is biased by the ambient air so that only a single temperature sensor is required. The sensor directly drives a vacuum-vent valve mounted on the output member of a vacuum-assist motor, thereby monitoring the relative position of the sensor and the vacuum assist output and physically moving with the stroke of the motor to form a feedback loop. This valve applies vacuum or vent to the assist motor to drive the stroke to its proper position and thereby maintain the desired temperature in the car. The stroke of the vacuum-assist motor operates various switches causing the operation of the system components, such as the temperature blend door, the CELO valve, the water valve, etc.

DESCRIPTION OF PREFERRED EMBODIMENTS

Figure 1:
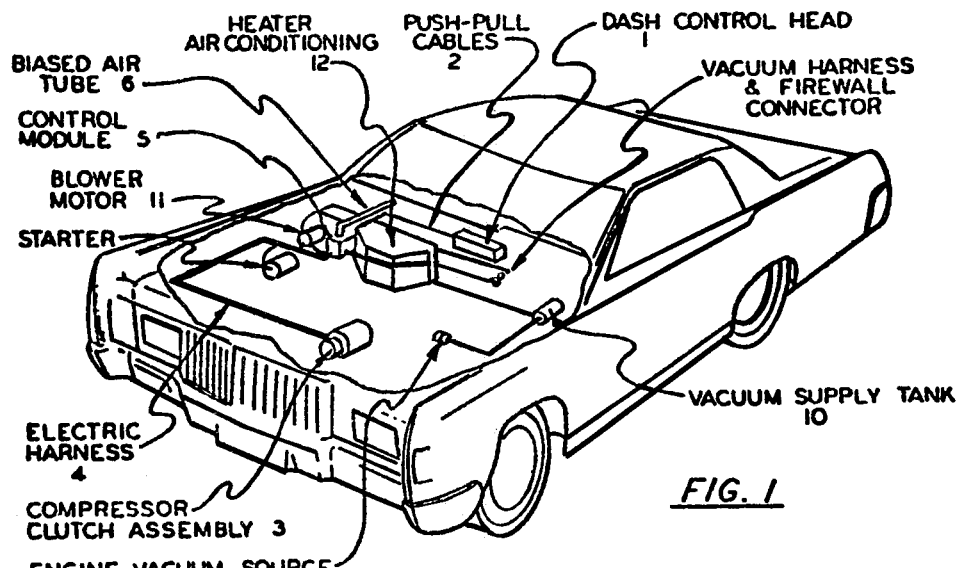
FIG. 1 is a partially cut away, prospective view of an automobile showing the installation of the automatic temperature control system of this invention.
Figure 1A:
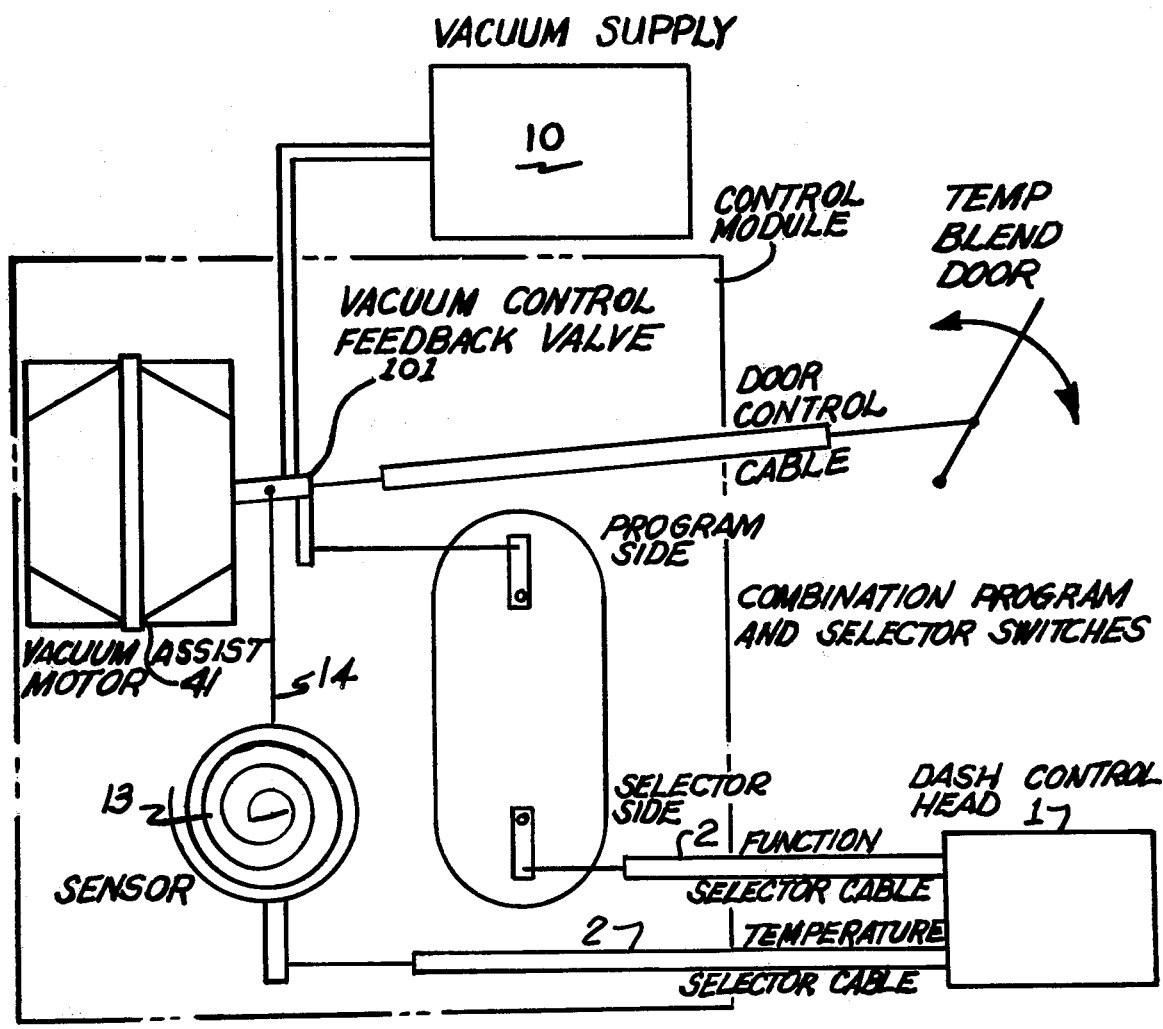
FIG. 1A is a schematic view of the control module, the vacuum supply, the temperature blend door, the dash control head and the interconnecting cables of this invention.

FIGS. 1 and 1A show the general arrangement of the components in the automatic temperature control system of the present invention. The driver of the automobile selects the mode and the temperature he desires by moving the controls on the dash control head 1. For instance, he might select automatic mode with a temperature of 75° F. This input is introduced into the system through two push-pull or tension cables 2, one selecting the mode and one the temperature at which the system will operate. These are conveniently Bowden cables, although other types could be used as well. The selection at the dash control head 1 commences the operation of the automatic temperature control system.

The blower motor for the fan is shown generally at 11 in FIG. 1. The compressor clutch assembly is connected to the control module 5 through electric harness 4.

The control module 5, as best shown in FIG. 1A, groups most elements at one place on the heater-air conditioning case 12, between the fan and the evaporator case (not shown), rather than being spread throughout the automobile as has been previously done. The items in this compact module are: a bimental sensor 13; the vacuum-assist motor 41 with feedback valve; program switches and valves; selector switches and valves operated by controls on the dash control head; the compressor ambient switch; and the resistor block for the fan. The control module 5 is connected to the dash control head by means of two push-pull cables 2, one for temperature selection and the other for mode selection. A third cable connects the vacuum-assist motor 41 to the temperature blend door, as shown in 1A. The control module 5 occupies a space approximating a cube of 6 inches on a side.

Vacuum is supplied to a vacuum-assist motor 41, located in the control module 5 from the engine vacuum source 9 through the vacuum supply tank 10. The position of the output stroke of motor 41 causes vacuum to be supplied through various valves or switches to activate the various stations of the system, such as the CELO valve, etc. The position of its stroke also activates the program electrical switches of the system.

By the use of this control module 5 a vastly improved automatic control system is provided since the wiring harness almost disappears and there are no electrical connections at the firewall or leads inside the car. The control module system moves everything under the hood and significantly frees the under-dash area. The electrical harness here is reduced over 90 percent from prior art manual systems. While the following detailed description relates specifically to air sensing means a complete description of the entire control system and the components thereof is contained in U.S. Pat. No. 4,063,682, supra.

As the operator sets the system for automatic temperature control, a push-pull cable, as shown in FIG. 1A, rotates the input shaft of the selector side of the system. The rotation of this shaft (not shown) would activate certain vacuum ports and electrical contacts. At the same time, he would set the temperature lever at the control head 1 to the in-car temperature he desired. This lever, also through a push-pull cable, would rotate the cup 15, shown in FIG. 2, in which the bimetal sensor 13 reposes. The inner end of the bimetal coil sensor 13 is affixed to the cup so that rotation of cup 15 would cause the output arm 14 operatively connected to the outer end of coil sensor 13 to move to the desired setting. The setting now acts as reference point for future corrections by the temperature control system. As the biased in-car air passes over the sensor 13, as described below, its output arm will move dependent upon the temperature of the biased air.

Figure 2:
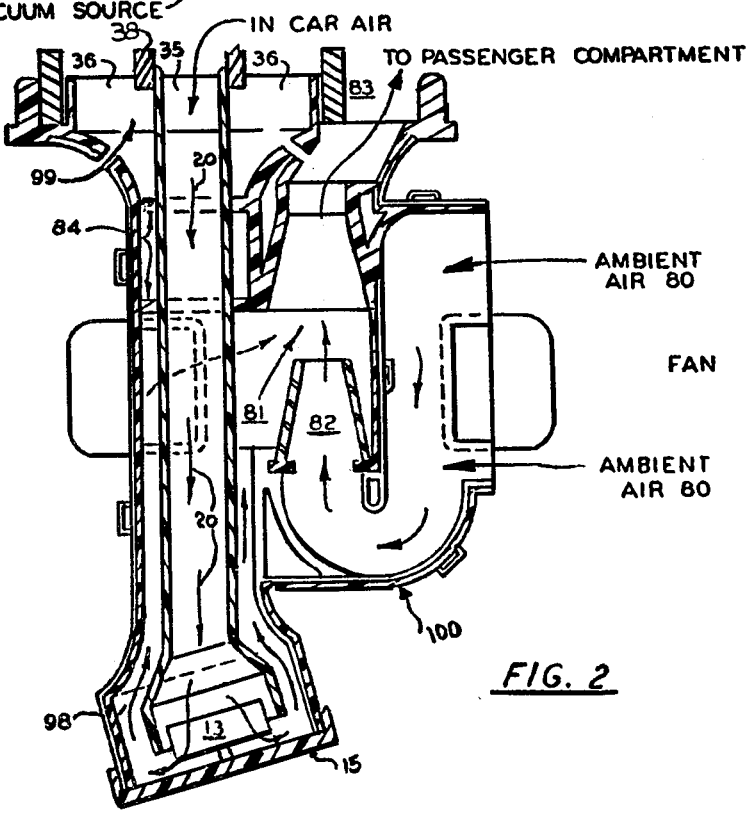
FIG. 2 is a cross-sectional view of the sensor housing and aspirator of the present invention.
Figure 3:
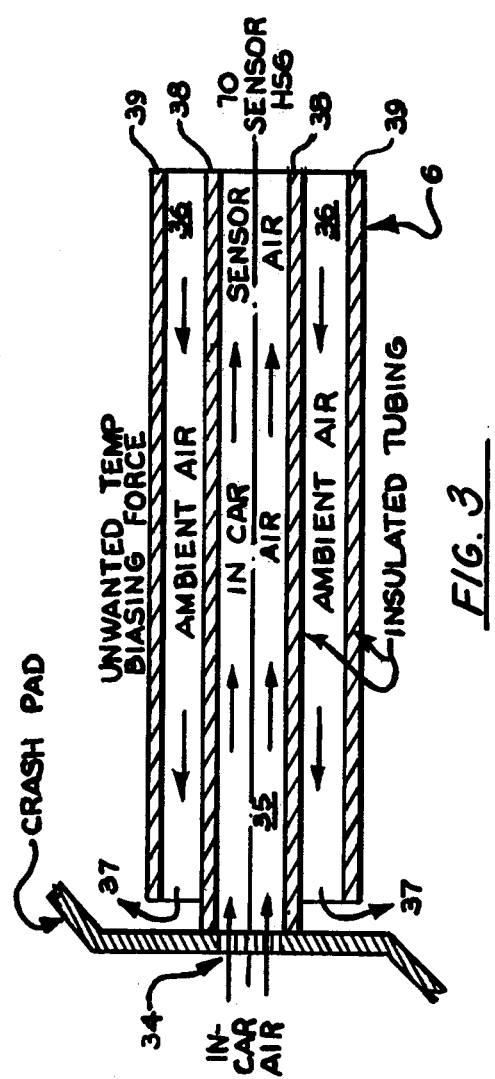
FIG. 3 is a cross-sectional view of the double-walled, biased tube of the present invention.

The in-car and ambient temperatures are sensed by air flowing through tube 6, a double-walled, biased tube with the first part shown in detail in FIG. 3 and the end portion shown in FIG. 2 which contains the sensor 13. It will be noted that double-walled tube in FIG. 2 is an extention of the double-walled tube in FIG. 3. This tube indicated generally by the numeral 6, is mounted behind the crash pad area of the automobile underneath the dashboard. In-car air is drawn though the gating 34 (FIG. 3) where it passes through the generally circular shaped area shown as 35 to the bimetal sensor 13 which is mounted in an aspirator housing 100 as shown in FIG. 2. At the same time, ambient air is taken into the aspirator housing, as shown in FIG. 2, whereby it passes to the outer annular walls of the double wall 6 as shown generally at 36. The ambient air exits near the crash pad, as indicated by arrows 37 in FIG. 3. Thus the ambient air passing through the space 36 will cause the in-car air passing through space 35 to become biased by heat transfer through walls 38. In addition to this biasing effect, the ambient air flowing through the space 36 provides a moving insulating barrier which will essentially reduce any unwanted temperature bias arising from the external heated air under the dashboard.

The inner walls 38 of the tube may be of any appropriate material which would allow the temperature transfer required, and I have found polyurethane foam to be an acceptable material. The outer walls 39 may be constructed of a paper tubing with a wire wrap. In a device built in accordance with this invention, the inner tube walls 28 are of approximately $\frac{7}{8}$ inches in inside diameter, and are approximately $\frac{1}{4}$ inches thick. The outer walls 39 have approximately 1-$\frac{5}{8}$ inches inside diameter and have a nominal wall thickness.

In the prior art two sensor, automatic control systems, the in-car air temperature sensor is five times as sensitive as the ambient air sensor and since this ratio has proven acceptable, it has been maintained in our system. Thus, in the biased, double-walled tube 6, the ambient air passing through space 36 should bias the air passing through space 35 by a factor of about one to five. The materials, dimensions, and aspirator shown and described provide this relationship.

Double-walled tube 6 feeds the biased air to sensor 13 through aspirator 100 as indicated by arrows 20 in FIG. 2. The biased air in space 35 is passed by the sensor 13, whereupon it exits through the annular area indicated at 98, through low pressure area 81 caused by nozzle 82, to the passenger compartment at exit 83. Seal 84 insures that this air does not again enter the double walled-tube 6. Ambient air enters the aspirator at 80 to pass through nozzle 82 to form the low pressure area at 81. Ambient air also enters the aspirator at 99 whereupon it passes through the outer space 36 in double-walled tube 6 to bias the in-car air for sensing.

The aspirator 100 is placed near the blower and ambient air enters from the windshield area. The aspirator 100 may be made of molded plastic with a wall of approximately 0.060 inch thickness and is glued, ultrasonically welded or stapled together.

Although this invention has been described with particular emphasis upon an automatic temperature control system for automobiles, many of the items are not limited to the specific structure of this system or to a temperature control system at all, but are applicable to many different applications. By the specific description herein recited, it is not intended to limit the applicability of these items or system, and it is to be understood that a coverage as wide as the applicable art will allow is being sought.

I claim:

1. Apparatus for biasing the temperature of a fluid stream comprising inner tubular means having first and second portions, an entrance at an end of the first portion and an exit at an end of the second portion, the first tubular portion being defined by a wall which permits heat conductivity therethrough, outer tubular means having first and second portions surrounding the inner tubular means and generally coextensive therewith, the first tubular portion of the outer tubular means separated from the second tubular portion of the outer tubular means by a seal, the first tubular portion of the outer tubular means having two ends, a fluid entrance being adjacent the seal at one end and a fluid exit being disposed at the second end; the second tubular portion of the outer tubular means having two ends, a fluid entrance being located at one end in communication with the exit of the second portion of the inner tubular means, and an exit disposed at the other end whereby fluid is allowed to enter the inner tubular means and pass through the first and second portions of the inner tubular means into the second portion of the outer tubular means to the exit of the second portion of the outer tubular means and a separate fluid path extends through the second portion of the outer tubular means.

2. Apparatus according to claim 1 in which a sensor is disposed at the exit end of the second portion of the inner tubular means.

3. Apparatus according to claim 1 in which the outer tubular means first portion is defined by thermally insulative material.

4. Apparatus according to claim 3 in which the thermally insulative material includes paper tubing.

5. Apparatus according to claim 1 in which the first tubular portion of the inner tubular means is composed of polyurethane.

6. Apparatus according to claim 1 in which an aspirator means is disposed in communication with the exit of the outer tubular means second portion, the aspirator means having an inlet exposed to the same fluid source as the entrance of the outer tubular means first portion.

7. A system for sampling the temperature of ambient air and controlled air using a single sensor comprising an inner tube means having walls which at least partially transmit heat therethrough and having an entrance end and an exit end, the entrance end being in communication with the controlled air, an outer tube means surrounding the inner tube means and having an entrance end and an exit end, the entrance of the outer tube being in communication with the ambient air, a temperature sensor disposed at the exit end of the inner tube, aspirator means disposed in communication with the exit end of the inner tube and having an inlet in communication with ambient air and having outlet means to direct the combined ambient air received from inlet of the aspirator and the controlled air to a desired location, whereby the temperature of the controlled air is biased by the ambient air passing through the outer tube.

* * * * *